Figure 1:
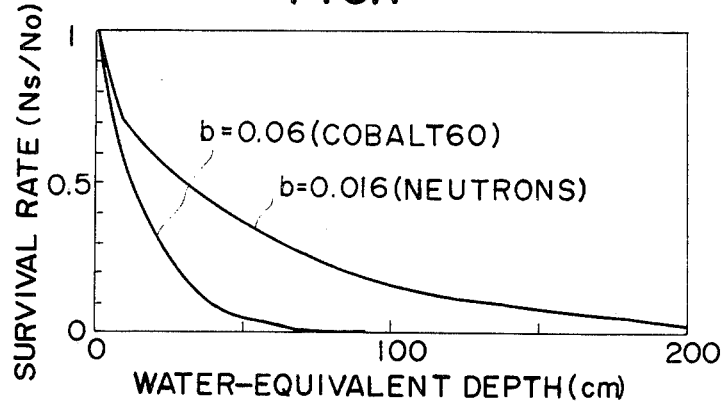

United States Patent [19]

Wada et al.

[11] 4,047,042

[45] Sept. 6, 1977

[54] METHOD OF DETERMINING THE WATER EQUIVALENT DEPTH OF SNOWFALL USING NEUTRONS OF COSMIC RAYS

[75] Inventors: Masami Wada, Higashikurume; Masahiro Kodama, Kita; Shinkichi Kawasaki, Yokohama, all of Japan

[73] Assignee: Rikagaku Kenkyusho, Japan

[21] Appl. No.: 586,510

[22] Filed: June 12, 1975

[30] Foreign Application Priority Data

June 15, 1974 Japan .................................. 49-68397

[51] Int. Cl.² .............................................. G01T 3/00
[52] U.S. Cl. .................................. 250/390; 250/391; 250/392; 250/308
[58] Field of Search ........... 250/390, 391, 392, 358 R, 250/357, 308

[56] References Cited

U.S. PATENT DOCUMENTS

| | | | |
|---|---|---|---|
| 3,432,656 | 3/1969 | Smith et al. | 250/358 |
| 3,532,883 | 10/1970 | Dresia et al. | 250/358 |
| 3,600,574 | 8/1971 | Glaza et al. | 250/391 |

FOREIGN PATENT DOCUMENTS

| | | | |
|---|---|---|---|
| 1,129,002 | 9/1959 | Germany | 250/255 |

OTHER PUBLICATIONS

*Telemetering System, Electronics,* Feb., 1951, by John A. Doremus, pp. 88-91.

*Primary Examiner*—Alfred E. Smith
*Assistant Examiner*—Tommy P. Chin
*Attorney, Agent, or Firm*—Bucknam and Archer

[57] ABSTRACT

A method of determining a depth of an accumulation of snow in which the water-equivalent depth of an accumulation of snow is determined from the count of survival neutrons of cosmic rays after passing through an accumulation of snow.

1 Claim, 2 Drawing Figures

METHOD OF DETERMINING THE WATER EQUIVALENT DEPTH OF SNOWFALL USING NEUTRONS OF COSMIC RAYS

This invention relates to a method of determining an accumulation of snow in terms of water-equivalent depth, using neutrons of cosmic rays.

Generally speaking, the estimation of snowfall in mountains has become increasingly important for estimation of available amounts of water and for forecasting floods caused by melting snow in mountainous areas. In estimating the amount of water from the depth of the snowfall it is necessary to determine the depth of the snowfall in terms of water equivalent depth. As is readily supposed, it is very difficult to station persons in mountains to engage in snowfall-measuring work, and therefore there has been a strong demand for a method by which the exact measurement of water-equivalent depth of an accumulation of snow can be made at an unmanned station.

There has been hitherto proposed a radioactive snowfall meter in which cobalt 60 and other radioactive isotopes are used to determine the water-equivalent depth of an accumulation of snow from the amount of radiation after passing through the whole depth of the snow. Such snowfall meter, however, has some defects. In using and handling radioactive isotopes, there are dangers to the human body. Disadvantageously, radiation from radioactive isotopes when passing through the snowfall, is absorbed too much, and it is useless in measuring a substantial depth of snowfall. Other problems are the necessity to correct data with reference to the half life decay of radioactivity, and measurement errors caused by scattering radiation from a point source of radioactivity. Also, there are some technical difficulties caused by the severe weather conditions in snowy mountains (freezing, high winds, low temperatures and other adverse conditions to which snowfall meters are exposed). In this connection conventional type radioactive snowfall meters have been mainly used for experimental purpose, and they are not useful for practical purposes. In the continuous measurement of cosmic rays, the inventors happened to find that the count of neutrons of cosmic rays decreases with the depth of snowfall through which the cosmic rays pass. The inventors applied this principle to the determination of snowfalls.

One object of this invention is to provide a method for determining the water-equivalent depth of snowfall from the count of the survival neutrons of cosmic rays passing through a snowfall.

Another object of this invention is to provide such snowfall measuring method which is useful for practical purposes, totally free from the defects mentioned above.

Still another object is to provide such snowfall measuring method which requires no attendant even in continuously measuring snowfall.

Figure 2:
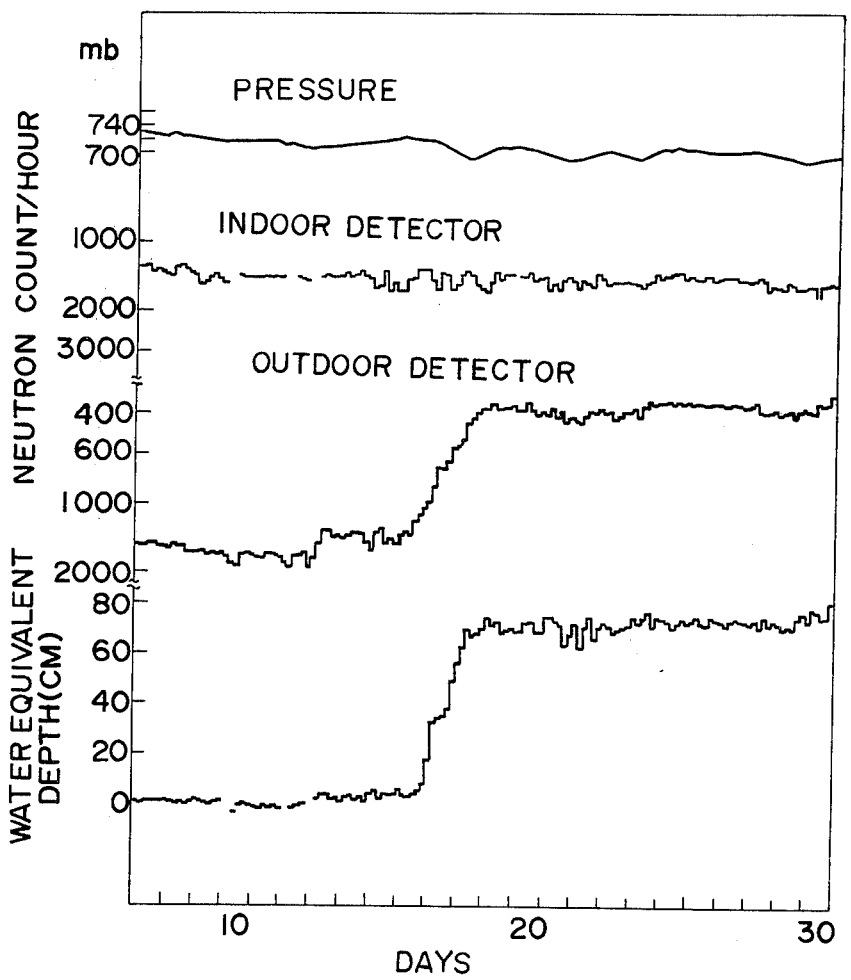

These and other objects and advantages of this invention will be better understood from the following description which is made with reference to the drawings:

FIG. 1 is a graphic representation showing the experimental result of absorption by water of neutrons of cosmic rays; and FIG. 2 is a graphic representation showing the result of continuous measurement of the water-equivalent depth of snowfall for 20 days.

A neutron counter tube (a brass tube, 7.6 centimeters in effective diameter and 30 centimeters long, being surrounded by its paraffin shield 3.7 centimeters thick, and filled with $B^{10}F_3$ as much as 45 centimeters Hg) was put at a shallow depth under the ground, a piece of board was put on the ground above the tube, and a water tank 150 centimeters in diameter was put on the board. FIG. 1 shows the result of absorption by water of the neutrons of cosmic rays passing through the depth of water in the tank. In FIG. 1, the rate of the count Ns of the post-passing neutrons to the count No of pre-passing neutrons of cosmic rays is on the ordinate, and the water-equivalent depth (cm) is on the abscissa. The approximate estimation of the survival rate of neutrons of cosmic rays after passing water is given by $e^{-bw}$, where $b$ is absorption factor (0.016/cm) and $w$ is water-equivalent depth (cm). Also, FIG. 1 shows a similar exponential but sharp decay of the survival rate of gamma radiation from cobalt-60 for comparison only. The absorption factor $b$ of the cobalt-60 curve is 0.06.

Assuming that measurement is made in the range in which the survival rate is 10 or more percent, the corresponding range of water-equivalent depth extends up to 40 centimeters if cobalt-60 is used whereas the range of water-equivalent depth extends as far as 130 centimeters if the neutrons of cosmic rays are used. Snowfalls to be actually measured range from 5 to 10 meters, equivalent to 100 to 200 centimeter depth of water, and therefore the count of neutrons of cosmic rays can be advantageously used as a measure of an accumulation of snow.

The water-equivalent depth $w$ is given in the following equation:

$$W = \frac{(\ln No - \ln Ns)}{b} \quad (1)$$

where $b$ is absorption factor (0.01 – 0.02/gcm$^{-2}$); $No$ is the count of neutrons of cosmic rays before passing through the snowfall; and $Ns$ is the count of neutrons of cosmic rays after passing through the snowfall. Thus, $w$ is given in unit of gcm$^{-2}$, and the figure of $w$ corresponds to the depth of water given in unit of centimeter. No and Ns can be measured at any given time, and generally, the error in the count is given as equal to $\sqrt{N}$. Therefore, the relative error $\sigma N$ is given by:

$$\sigma N = \frac{\sqrt{N}}{N} = \frac{1}{\sqrt{N}} \quad (2)$$

Accordingly the relative error of snowfall is:

$$\sigma s = \frac{1}{bw \sqrt{N}} \quad (3)$$

If the counter tube as mentioned earlier is used in an open field at the sea level, the count of neutrons of cosmic rays is about 200 in one hour. Therefore, the accuracy of the total count for 5 hours is about ±5 percent, and the accuracy of the total count for one day is about ±2 percent. In the mountains the count of neutrons of cosmic rays increases to several times that in a field, and the accuracy accordingly increases. The accuracy required for measurement is about ±5 percent, and therefore the accuracy attained by this invention is beyond that which is usually required.

The intensity of neutrons of cosmic rays depends somewhat on atmospheric pressure and other factors in interplanetary space. The continuous measurement of the intensity of neutrons of cosmic rays at the accuracy of ±0.1% is performed worldwide at numerous monitor stations including Rikagaku Kenkyu-sho, and therefore the count of survival neutrons of cosmic rays after passing through the snowfall can be corrected with reference to the instantaneous intensity of neutrons of cosmic rays. Thus, the water-equivalent depth of snowfall can be reliably determined. As is readily understood from Equation (1), the count Ns of neutrons of cosmic rays after passing through the snowfall and the count No of neutrons of cosmic rays falling on the snowfall are simultaneously determined, and from these different counts the water-equivalent depth of snowfall $w$ can be calculated. In this case one detector is put at a place where no snow falls, whereas another detector is put at a place where snow falls, and the two detectors must be calibrated with each other. In view of the unevenness of the geographical distribution of intensity of neutrons of cosmic rays and in view of the effect on the accuracy of measurement, the two detectors are preferably 10 kilometers apart from each other and at altitudes differing by 100 meters or less. A $B^{10}F_3$ neutron counter of the type as mentioned above was used for continuous measurement of water-equivalent depth of snowfall at the Tokyo University Cosmic Ray Station in Mt. Norikuradake (2770 meters high) and the snowfall was determined at a very high accuracy, as shown in FIG. 2. The count of neutrons of cosmic rays and water-equivalent depths were plotted for 20 days. The advantages attributable to the use of neutrons of cosmic rays are:

1. the snowfall over as large area as required can be determined at a high accuracy;
2. the source of radiation is infinitely extensive and therefore free from such error as would be caused by radiation scattering from a point source;
3. radioactive sources which are dangerous to the human body are not used;
4. no laborious work is required for accurately positioning a detector with respect to a radiation source, and less expense is involved.

From the foregoing, it will be appreciated by the artisan that the invention provides a method of determining the water-equivalent depth of an accumulation of snow utilizing neutrons contained in naturally occurring cosmic rays. Basically, the method of invention comprises the steps of counting the neutrons of cosmic rays incident upon a given accumulation of snow, counting the neutrons of said cosmic rays after passing through the accumulation of snow, and then determining the water-equivalent depth of the snow from these counts of neutrons and upon the basis of a special formula. This special formula is:

$$W = \frac{[\ln N_o - \ln N_s]}{b},$$

wherein $N_o$ is the count of neutrons of the cosmic rays incident upon said snow, $N_s$ is the count of neutrons of the cosmic rays after passing through said snow, $b$ is an absorption factor within the range $0.01/\text{gcm}^{-2}$ to $0.02/\text{gcm}^{-2}$, and W is the water-equivalent depth, in cm., of said accumulation of snow.

What is claimed is:

1. A method of determining the water-equivalent depth of an accumulation of snow, which comprises the steps of counting the neutrons of cosmic rays incident upon a given accumulation of snow, counting the neutrons of said cosmic rays after passing through said accumulation of snow, and determining the water-equivalent depth of said accumulation of snow from said countings of neutrons and upon the basis of the formula:

$$W = \frac{[\ln N_o - \ln N_s]}{b},$$

wherein $N_o$ is the count of neutrons of the cosmic rays incident upon said snow, $N_s$ is the count of neutrons of the cosmic rays after passing through said snow, $b$ is an absorption factor within the range $0.01/\text{gcm}^{-2}$ to $0.02/\text{gcm}^{-2}$, and W is the water-equivalent depth, in cm., of said accumulation of snow.

* * * * *